US009261365B2

(12) United States Patent
Rothschild

(10) Patent No.: US 9,261,365 B2
(45) Date of Patent: Feb. 16, 2016

(54) DEVICE, SYSTEM AND METHOD FOR REMOTELY ENTERING, STORING AND SHARING ADDRESSES FOR A POSITIONAL INFORMATION DEVICE

(71) Applicant: Leigh M Rothschild, Sunny Isles Beach, FL (US)

(72) Inventor: Leigh M Rothschild, Sunny Isles Beach, FL (US)

(73) Assignee: ROTHSCHILD LOCATION TECHNOLOGIES, LLC, Bay Harbour Islands, FL (US)

( * ) Notice: Subject to any disclaimer, the term of this patent is extended or adjusted under 35 U.S.C. 154(b) by 0 days.

(21) Appl. No.: 14/022,193

(22) Filed: Sep. 9, 2013

(65) Prior Publication Data

US 2014/0012496 A1    Jan. 9, 2014

Related U.S. Application Data

(63) Continuation of application No. 12/882,754, filed on Sep. 15, 2010, now Pat. No. 8,606,503, which is a continuation of application No. 11/413,890, filed on Apr. 28, 2006, now Pat. No. 7,917,285.

(51) Int. Cl.
*G01C 21/00* (2006.01)
*G08G 1/005* (2006.01)
*G08G 1/0968* (2006.01)

(52) U.S. Cl.
CPC ............... *G01C 21/00* (2013.01); *G08G 1/005* (2013.01); *G08G 1/09685* (2013.01); *G08G 1/096816* (2013.01); *G08G 1/096866* (2013.01); *G08G 1/096883* (2013.01)

(58) Field of Classification Search
CPC .......... G08G 1/096861; G08G 1/0969; G08G 1/096827; G08G 1/096872; G01C 21/3629
See application file for complete search history.

(56) References Cited

U.S. PATENT DOCUMENTS

| 6,073,075 | A | * | 6/2000 | Kondou | G01S 5/0027 340/988 |
|---|---|---|---|---|---|
| 6,202,023 | B1 | * | 3/2001 | Hancock | G01C 21/20 701/516 |
| 6,584,402 | B2 | * | 6/2003 | Fukushima | G01C 21/3407 342/357.31 |
| 7,084,872 | B2 | * | 8/2006 | Etgen | G06T 11/206 345/440 |
| 7,523,417 | B2 | * | 4/2009 | Hintermeister | G06F 9/4443 715/804 |
| 2002/0154173 | A1 | * | 10/2002 | Etgen | G06F 3/04855 715/833 |
| 2002/0156578 | A1 | * | 10/2002 | Kondou | G01S 5/0027 701/516 |
| 2003/0018428 | A1 | * | 1/2003 | Knockeart | G01C 21/3415 342/357.31 |
| 2003/0018887 | A1 | * | 1/2003 | Fishman | H04L 29/06 713/151 |

(Continued)

*Primary Examiner* — Ian Jen
(74) *Attorney, Agent, or Firm* — Greer, Burns & Crain, Ltd.

(57) ABSTRACT

Devices, systems and methods for remotely entering, storing and sharing location addresses for a positional information device, e.g., a global positioning system (GPS) device, are provided. The present disclosure allows a user to easily and safely enter an address into a GPS device by giving that address to a remote communications link and to have that link automatically program the user's GPS device for usage. The device, system and method of the present disclosure further allows the user to use this stored address(es) on multiple GPS devices without having to manually enter the address(es).

15 Claims, 5 Drawing Sheets

(56) References Cited

U.S. PATENT DOCUMENTS

| | | | |
|---|---|---|---|
| 2003/0050751 A1* | 3/2003 | Fukushima | G01C 21/3407 701/420 |
| 2003/0055530 A1* | 3/2003 | Dodson | G06F 17/3089 700/231 |
| 2003/0126264 A1* | 7/2003 | Chithambaram | G01S 5/02 709/227 |
| 2004/0064245 A1* | 4/2004 | Knockeart | G01C 21/3415 701/414 |
| 2004/0066330 A1* | 4/2004 | Knockeart | G01C 21/3415 342/357.31 |
| 2004/0068567 A1* | 4/2004 | Moran | H04L 67/14 709/227 |
| 2004/0228489 A1* | 11/2004 | Ishibashi | G01C 21/26 380/258 |
| 2006/0041374 A1* | 2/2006 | Inoue | H04L 67/36 701/500 |
| 2006/0094353 A1* | 5/2006 | Nielsen | H04M 1/274566 455/17 |
| 2006/0240860 A1* | 10/2006 | Benco | H04M 1/66 455/550.1 |
| 2007/0143015 A1* | 6/2007 | Kim | G01S 19/06 701/469 |
| 2009/0073254 A1* | 3/2009 | Li | G03B 17/00 348/36 |
| 2011/0273570 A1* | 11/2011 | Sakaki | H04N 5/23203 348/207.11 |
| 2011/0273579 A1* | 11/2011 | Sakaki | H04N 7/183 348/222.1 |

* cited by examiner

DEVICE, SYSTEM AND METHOD FOR REMOTELY ENTERING, STORING AND SHARING ADDRESSES FOR A POSITIONAL INFORMATION DEVICE

PRIORITY

The present application is a continuation application of, and claims priority to U.S. patent application Ser. No. 12/882,754 filed on Sep. 15, 2010, which is in turn a continuation application of, and claims priority to U.S. patent application Ser. No. 11/413,890, filed Apr. 28, 2006, the contents of both U.S. patent application Ser. No. 12/882,754 and U.S. patent application Ser. No. 11/413,890 are hereby incorporated by reference in their entireties.

BACKGROUND

1. Field

The present disclosure relates generally to navigational or positional information systems, and more particularly, to devices, systems and methods for remotely entering, storing and sharing addresses for a positional information device, e.g., a global positioning system (GPS) device.

2. Description of the Related Art

GPS (Global Positioning System) devices are everywhere. These devices provide a user with such information as latitude and longitude, accurate time, heading, velocity, etc. GPS devices are particularly useful in automobiles and other vehicles. Many individuals have multiple GPS devices if they own, for instance, two cars that both have the device. Conventionally, most devices will allow a user to store information such as address points in the internal memory of the device. Some devices will allow you to store this information on removable memory, e.g., memory cards, optical media, etc. In the latter case, this can be particularly helpful because a list of addresses, for instance, will be useful to be moved from GPS device (e.g., a first vehicle) to GPS device (e.g., a second vehicle).

Conventionally, a GPS device will inform a user how to get from one point to another. Additionally, it provides information on points of interest, e.g., hotels, restaurants, historic landmarks, etc. Some GPS units will also provide information including current speed of travel as well as average speed of travel.

GPS devices must be programmed by the user to tell the device the address that the user wishes to travel to. The GPS device then provides route guidance information to the user. If the user has already programmed the address in (in many devices the address is referred to as a waypoint), many GPS devices will store this address information in internal or removable memory so that the device will be able to retrieve this information for future usage.

There are several major problems with the current systems of programming addresses (e.g., destination information) into a GPS device. The first problem is that different devices recognize addresses differently depending on the preprogrammed information that has been stored. Additionally, different devices have different user interfaces and program differently. If a user knows how to program one device, he may not necessarily know how to program another unit. By example, if a user tries to program the address 19333 Collins Avenue, Sunny Isles, Fla., many devices will not accept this address. Instead, the user will have to decide which city the street address lies in. In many cases, this can be a laborious and timely procedure. In the previous example, some GPS devices will accept Sunny Isles Beach as the proper address, while others will only accept North Miami Beach, while still others will require an entry of North Miami, while still others will only recognize Sunny Isles as the correct entry. In some cases, a user can spend 15 to 20 minutes attempting to program in a single address. In some cases, the user is never able to have the unit accept an address, therefore not allowing the use of the GPS device.

A second problem that currently exists is that many users have multiple vehicles that go to the same address and require route guidance by the GPS device. The current systems would require the user to enter the requested address (e.g., destination information) or multiple addresses into all vehicle units individually. This is an unnecessary waste of time, and as discussed above, can be a very difficult assignment.

A third problem that currently exists, is that many times a user needs to route to an address or destination while the user is driving. It may be an address that the user does not even have a correct city designation for. The current GPS devices make it extremely difficult or impossible for a user to program the device for an address while driving. In fact, for reasons of safety, some GPS devices discourage or lock out users from address entry while the vehicle is being operated. However, a definite need exists for a user to quickly program the GPS device to a desired address.

A current and major trend in automobile technology is automobile telematics. Many of today's cars feature systems that allow the user to communicate with a central processing center in case of emergency. Routine features allow the user to receive help and directions from a live agent or operator, and further allow the processing service center to unlock car doors, track stolen vehicles, warn a user when an airbag has deployed and provide information on various subjects, e.g., points of interests along travel. Examples of telematics systems include Onstar of Troy, Mich., Mercedes Assist of Montvale, N.J. and Lexus Link of Troy, Mich.

Despite the various services that the telematics companies provide, one service that they do not provide is the automatic programming of a vehicle's GPS device. Yet, a clear need exists for a system and method to allow a user to be able to easily, quickly and safely program their GPS device(s) with address/destination information.

SUMMARY

The present disclosure provides a device, system and method of remotely entering, storing, and sharing addresses for Global Positioning Satellite (GPS) devices. Additionally, a system and method of programming GPS units from a link on the Global Computer Network (e.g., the Internet) is also provided.

According to one aspect of the present disclosure, a method for entering location information into a positional information device is provided. The method includes receiving a request for at least one location from a user; determining coordinates of the least one requested location; and transmitting the determined coordinates to the device. The receiving step includes receiving an identifier of the device, wherein the identifier is a mobile phone number or an IP address.

In various different aspects, the request is received by voice communication and/or data transfer. Furthermore, the request may be received from the device and/or a remote computer.

In another aspect, the determining step includes retrieving the coordinates from a database residing on a server. In a further aspect, the determining step includes retrieving the coordinates from at least one second positional information device.

In yet another aspect of the present disclosure, the determining coordinates step includes resolving an address of the at least one location into latitude and longitude coordinates. The address may be determined by information associated to the address, wherein the associated information is a name of a person residing at the address, a cross street of the address, a zip code of the address, a phone number of the address or an alternative spelling of the address.

In a further aspect of the present disclosure, a positional information device includes a locational information module for determining location information of the device; a communication module for transmitting a request for at least one location remote of the device and for receiving coordinates of the at least one location; a processing module configured to receive the coordinates from the communication module and determine route guidance based on the location of the device and the received coordinates; and a display module for displaying the route guidance. The communication module is configured to transmit the request by voice communications and/or wireless data transfer.

In another aspect of the present disclosure, a system for entering location information into a positional information device is provided. The system includes a server configured to receive a request for at least one location, determine coordinates of the least one requested location and to transmit the determined coordinates to the device; the positional information device including a locational information module for determining location information of the device; a communication module for receiving coordinates of the at least one location from the server; a processing module configured to receive the coordinates from the communication module and determine route guidance based on the location of the device and the received coordinates; and a display module for displaying the route guidance; and a communications network for coupling the positional information device to the server.

In one aspect, the communications network is a telematics network.

In a further aspect, the server is operated by a live operator and the request for the at least one location is received by voice communications.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

Devices, systems and methods for remotely entering, storing and sharing location addresses for a positional information device, e.g., a global positioning system (GPS) device, are provided. The present disclosure allows a user to easily and safely enter an address into a GPS device by giving that address to a remote communications link and to have that link automatically program the user's GPS device for usage. The device, system and method of the present disclosure further allows the user to use this stored address(es) on multiple GPS devices without having to manually enter the address(es).

Figure 1:
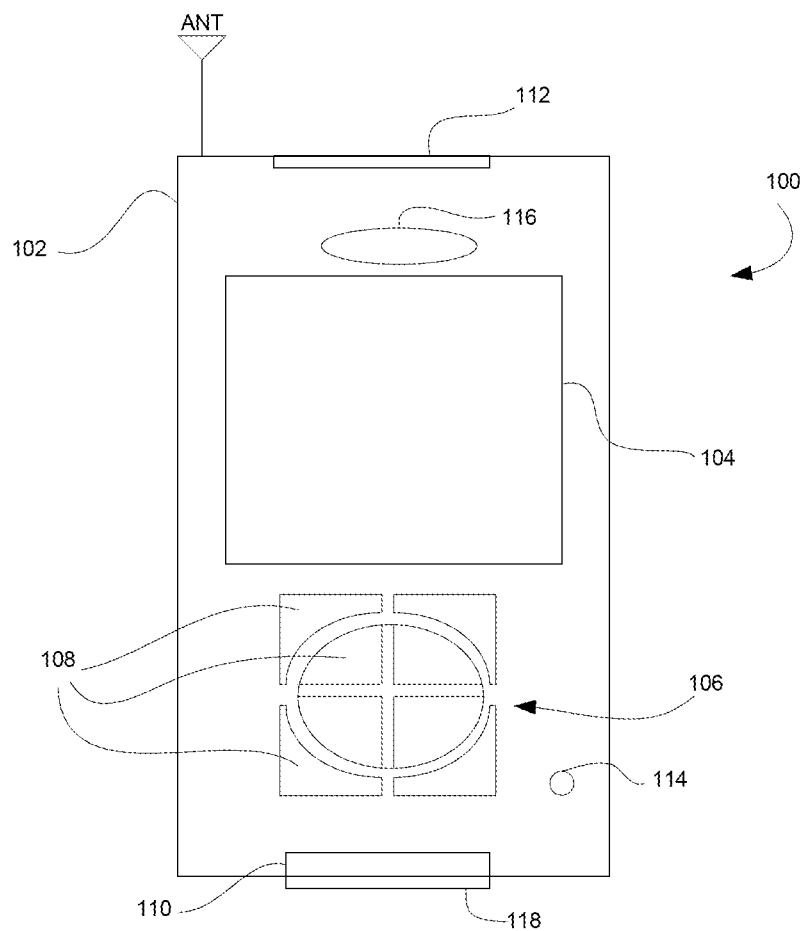
FIG. 1 is front view of a positional information device according to an embodiment of the present disclosure.

Referring to FIG. 1, a global positioning system (GPS) device 100 in accordance with an embodiment of the present disclosure is illustrated. Although the device shown and described in relation to FIG. 1 is a hand-held device, it is to be understood the principles of the present disclosure may be applied to any type of navigation or positional information device including but not limited to a vehicle-mounted device, a GPS receiver coupled to a desktop computer or laptop, etc. Furthermore, the present disclosure may apply to various types of vehicles such as an automobile, a boat, a bicycle, etc. It is also to be appreciated that the components described below may not necessarily be disposed in a single housing but incorporated into another device or structure, for example, components of the device may be integrated into a dashboard of an automobile.

The GPS device 100 includes various electrical components, which will be described in detail below, disposed in a generally rectangular housing 102. A display module 104 is provided for displaying a location of a user, a map, coordinates, waypoints, frequently accessed addresses, personal information, etc. As will be described in more detail below, the display module 104 may include a touch screen for facilitating user input of information. Input module 106 includes a plurality of buttons 108 for inputting data and navigating through a plurality of menus and/or maps. The GPS device 100 further includes a storage module 110 for storing a plurality of maps, frequently used addresses, traveled routes, etc and a communication module 112 for transmitting stored data to another device, e.g., a personal computer, a personal digital assistant (PDA), a server residing on the Internet, etc. and for transmitting verbal communications to other devices. The device 100 will include a microphone 114 for acquiring audio from the user of the device to input data and to communicate to others. A speaker 116 for audibly producing communications from others, directions, warnings and/or alarms to a user is also provided.

Figure 2:
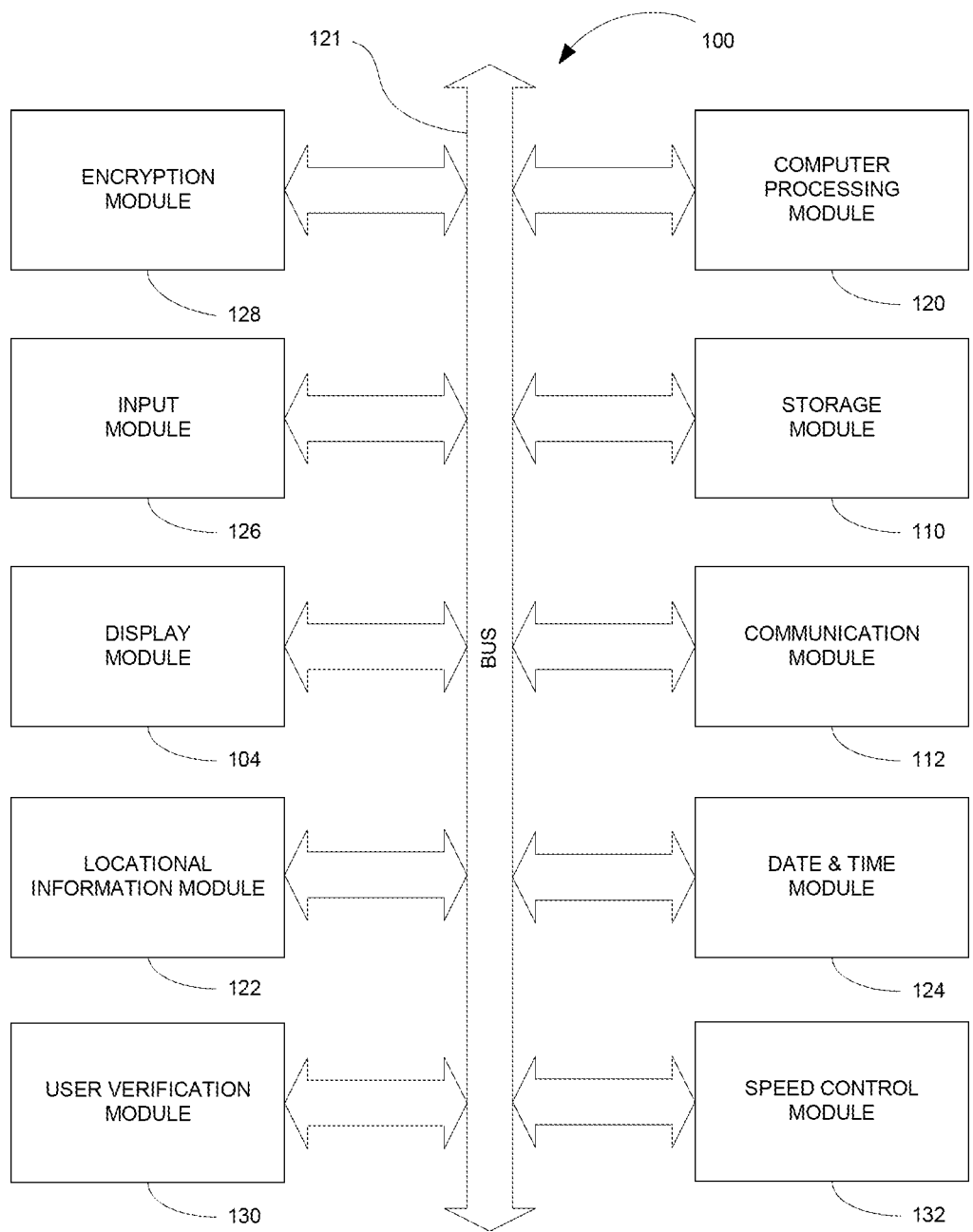
FIG. 2 is a block diagram of various modules included in the device illustrated in FIG. 1.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM). The various processes and functions described herein may either be part of the micro instruction code or part of an application program (or a combination thereof) which is executed via the operating system. Exemplary operating systems include but are limited to SymbianOS, Windows Mobile/Windows CE, Palm OS, Linux, Blackberry OS, etc. which have been developed for mobile computing applications and can handle both data computing and communication applications.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

A locational information module 122 is provided for determining a location of the device 100 and/or user. The locational information module 122 may include a receiver and antenna ANT employing conventional locational information processing technology such as Global Positioning Satellite (GPS) Technology, Loran Technology, or any other available locational technology, to indicate the exact location or coordinates, e.g., latitude, longitude and altitude, of the device 100. Exemplary GPS receivers and antennas are described in U.S. Pat. Nos. 5,654,718 and 6,775,612, the contents of both of which are herein incorporated by reference. It is to be appreciated that the latitude, longitude and altitude may be used to interact with maps stored in memory or in the storage module 110 of device 100 to determine the city, state or address of the location the device 100. Furthermore, the locational information module 122 may calculate routes traveled, velocity or speed of a vehicle including the device 100, etc., or alternatively, may send the position coordinates to the processing module 120 at a predetermined sampling period where the processing module will perform the calculations.

Furthermore, the device 100 will include a date and time module 124. The date and time module 124 will use standard computer chip processing technology widely in use, or alternatively, input from locational information module 122, e.g., a GPS receiver, to supply the date and time. The date and time may be associated or correlated with routes traveled, a particular location and speeds and may be employed to determine velocity or speed of the user of the device 100 whether in a vehicle, on a bicycle or while walking.

The device 100 will also contain a display module 104 for displaying a location of a user, a map, coordinates, waypoints, frequently accessed addresses, etc. This display may be in any current form in the art, including Liquid Crystal Displays (LCD), Light emitting diode displays (LED), Cathode Ray Tube Displays (CRT) or any other type of display currently existing or existing in the future. The display module 104 will include an audio output device 116, e.g., a speaker, headphone jack, etc., allowing the user to also hear audio output from the device 100, e.g., for audibly producing directions to a desired location or predetermined address. The speaker 116 will also be used in conjunction with microphone 114 and communication module 112 to enable voice communications as will be described below.

The device 100 of the present disclosure will contain a user input module 126 to either receive user instructions via text input by the way of buttons 108, a standard keyboard interface coupled to the device, or a character recognition capture device which translates user text input into alphanumeric characters. Preferably, the character recognition device is a touch screen which overlays the display module 104 and text is entered via a pen-like stylus. Such input devices are standard and currently available on many electronic devices including portable digital assistants (PDAs) and cellular telephones. Microphone 114 will be further coupled to the input module 126 for capturing any audio information spoken by the user and the input module will further include an analog-to-digital (A/D) converter for converting the spoken audio information into a digital format. Furthermore, the input module may include a voice recognition processor that translates the digital human voice into alpha numeric characters for user input. The user will utilize the user input module 126 to enter various data, for example, a plurality of destination addresses, waypoints, etc.

The storage module 110 includes internal storage memory, e.g., random access memory (RAM), or removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. The storage module 110 will store various types of information such as the inputted destination addresses, routes traveled by the user, the user's home address, etc. The storage module 110 will further store a plurality of geographical maps. In operation, the processing module 120 will process information received from overhead satellites and calculate the geographic location that the device 100 is currently at. The processing module 120 then plots that location on a graphic representation of a map stored in the storage module 110, e.g., internal or external memory. This map is then displayed on the display module 104 of the device 100. The map optionally will include points of interest also plotted on the map. By example, hospitals, police offices, gas stations, ATMs, hotels, restaurants, etc. can also be displayed. These point of interest locations are placed on the map in their proper locations by the publisher of the map when the map is published, or alternatively, these locations are stored in an internal address database and then dynamically placed on the graphical representation map by the processing module 120 as the map displays on the display module 104.

Maps may be provided for different areas via multiple removable memory cards, e.g., a memory card for each state in the United States. Alternatively, different maps may be received wirelessly via the communication module 112 and loaded into memory or the storage module 110 as needed. The processing module 120 will determine based on the information received from the locational information module 122 that a map corresponding to the devices current position is not available and the processing module 120 will request an appropriate map from a service provider available on a communication network accessed via the communication module 112.

The communication module 112 will enable the device 100 to transmit or transfer information, e.g., current location of a vehicle, speed of a vehicle, time and date of the recorded location and/or speed, etc., to other computing devices and to receive information from other computing devices, e.g., maps, software updates, etc. Furthermore, the communication module 112 will enable voice communications between the device 100 and other devices, remote operators, etc. The communication module 112 will perform its functionality by hardwired and/or wireless connectivity. The hardwire connection may include but is not limited to hard wire cabling, e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), or any other type of communication protocols or systems currently existing or to be developed for wirelessly transmitting data. The communication module will compress and encode the encrypted information for transmission using any known wireless communication technology. It is to be appreciated that the communication module may include a single integrated circuit chip to perform data transfer and voice communications or a single module including a separate data transfer chip, e.g., a WiFi transceiver, and a separate voice communication chip, e.g., a CDMA chip. Preferably, the communication module will operate on the wireless GPRS (General Packet Radio Service) data protocol or a 3G protocol such as W-CDMA, CDMA2000 and TD-SCDMA. Both the GPRS and 3G protocols have the ability to carry both voice and data over the same service.

The device 100 will also include an encryption module 128. The encryption module 128 will use conventional code encryption algorithms currently in use or that will be in use in the future such as symmetric-key algorithms, e.g., DES, Triple-DES, Blowfish, RC2, RC4, RC5, etc, and asymmetric-key algorithms, e.g., Diffie-Hellman, RSA, ElGamal, etc. to encrypt the data information that comes into the user input module 126 and/or that is stored in the storage module 110. In one embodiment of the present disclosure, the encryption module 128 will always encrypt the data information, but in other embodiments, the user will select whether to encrypt the data or to leave the data unencrypted.

Upon initialization of device 100, processing module 120 prompts the user via display module 104 or speaker 116 to select a code string that the user wishes to use. The user selects an appropriate code string and enters the code string into the device 100 with input module 126 via buttons 108, microphone 114 or touch screen. The input module 126 sends the code string to the processing module which in turn sends this string to encryption module 128. The encryption module 128 then uses this code string to encrypt (using standard encryption algorithms identified above) all addresses and route points (or just the addresses and route points that the user designates) and store this information in the storage module 110. When the GPS device 100 is inactive, all information in the storage module 110 is encrypted. When the GPS device 100 is active, the information in the storage module 110 is sent to the encryption module 128 which after receiving the user's code string decrypts the information, and then sends the information to the processing module where it can then be presented to the user on the display module 104.

In another embodiment of the present disclosure, the GPS device 100 will include a hardware interlock 118 to prevent the removal of the storage module 110. The interlock 118 may be a detent configured to engaged a memory card being employed, a mechanical door which prevents access to the storage module 110, or a mechanism which physical rejects the storage module 110. In this embodiment, the user would submit the code string to the encryption module 128 via the input module 126 which would then accept the code string and instruct the processing module 120 to unlock the hardware interlock 118 and allow user removal of the storage module 110. If the code string is not accepted, the storage module 110 will not be able to be removed.

In another embodiment, the device 100 will further include a user verification module (UVM) 130. The user verification module 130 will indicate and verify the identity of the user of the device 100. The user verification module 130 may execute a password protection algorithm or may include an identity capture device, either incorporated into the device 100 or coupled externally via a cable. The identity capture device may be a biometric device, such as a retinal scanning device, finger print reader, facial recognition reader or another type of user identity verification input device which will collect information on the user to be compared to information that has previously been stored in the device's memory. One such exemplary fingerprint reader is the BioTouch™ fingerprint reader commercially available from Identix Incorporated of Minnetonka, Minn. It is to be noted that identity detection devices such as biometric devices are common and are currently widely in use. It is to be further noted, that identity verification devices that are not yet in use such as DNA detection, etc, would also be compatible with device 100. In one embodiment, the identity of the user may be required in addition to the entering of a code string to decrypt information on the storage module 110. In a further embodiment, the identity of a particular user may be linked to their code string and, upon verification of the identity of a user, the linked code string will be submitted to the encryption module 128. In another embodiment, the identity of the user may be required to unlock the interlock 118.

Figure 3:
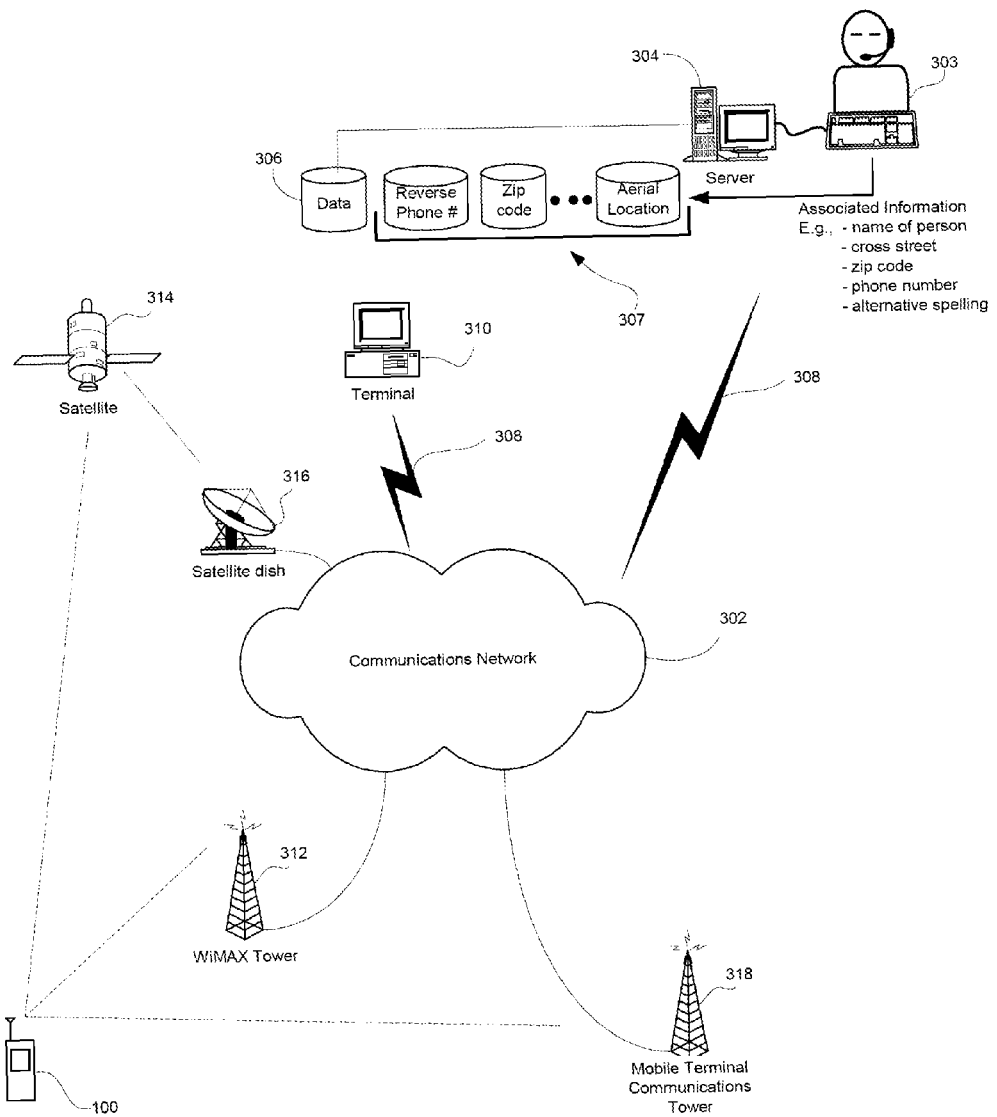
FIG. 3 is a diagram of an exemplary system for entering, storing and sharing location information in GPS devices in accordance with an embodiment of the present disclosure.
Figure 4:
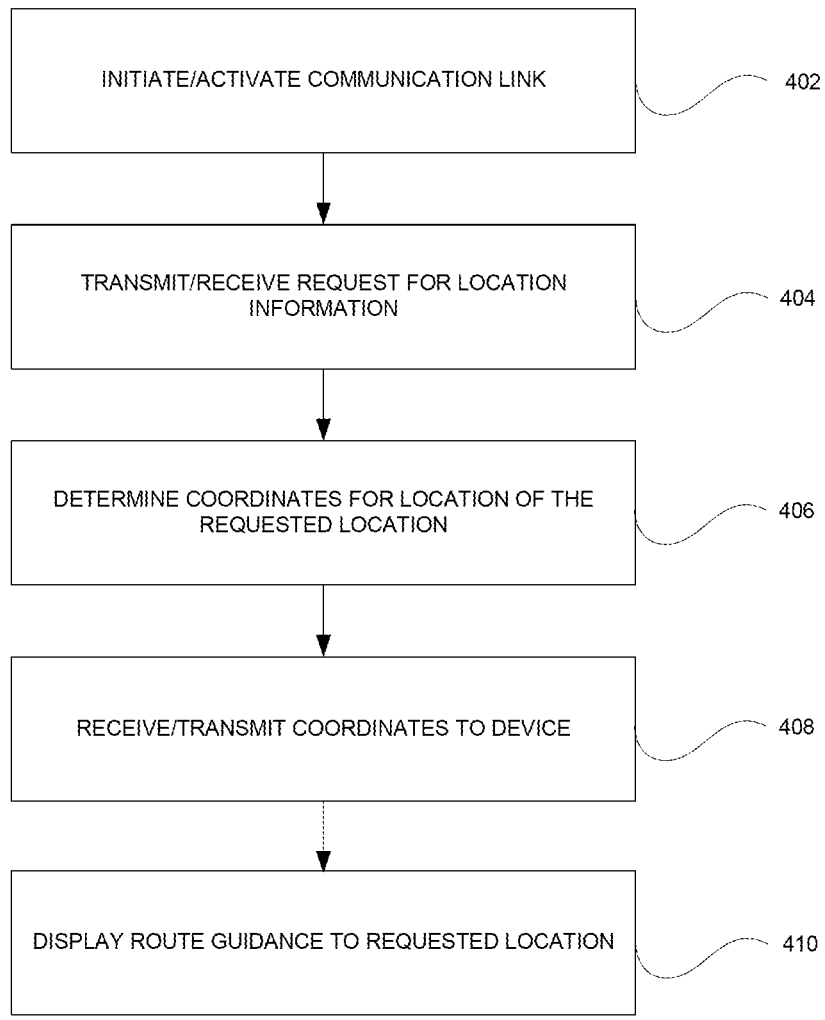
FIG. 4 is a flow diagram illustrating a method for entering, storing and sharing location information in GPS devices according to an embodiment of the present disclosure.

A system and method for remotely entering, storing and sharing location address information will be described in relation to FIGS. 3 and 4. Referring to FIG. 3, the GPS device 100 will communicate to a central server 304 via a telematics communications network 302, e.g., a network that enables data and voice communications. The device 100 will couple to the communications network 302 via the communication module 112 which enable data transmission and voice communications. The communication module 112 may connect to the communications network 302 by any known communication means or combination thereof includes WiFi connectivity via a WiFi tower (e.g., of various types including 802.11a/b/g) or a WiMAX tower 312 in accordance with IEEE 802.16 specifications; infrared connectivity; satellite communications including orbital satellite 314 and satellite dish 316; radio frequency; a mobile terminal communications technology, e.g., via a mobile terminal communications tower 318 employing FDMA, TDMA and CDMA technology, PCS, and 3G technology, etc.

The server 304 may be connected to the communications network 302, e.g., the Internet, by any known means, for example, a hardwired or wireless connection 308, such as dial-up, hardwired, cable, DSL, satellite, cellular, PCS, wireless transmission (e.g., 802.11a/b/g, 802.16, etc.), etc. It is to be appreciated that the network 302 may be a local area network (LAN), wide area network (WAN), global area network (GAN) in accordance with IEEE 802.20, the Internet or any known network that couples a plurality of computing devices to enable various modes of communication via network messages. Furthermore, the server 304 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

It is to be appreciated that the device 100 and server 304 may use any single communication method described above or any combination thereof to provide telematics service, i.e., a combination of telecommunications and data transfer. For example, the device and server may communicate via CPRS and/or 3G technology which will allow the transmission of voice and data over the same service. As another example, the device 100 and server 304 may communicate using WiMAX (e.g., IEEE 802.16) technology where data is transferred using the above-described Internet protocols and voice communications is conducted using VoIP (Voice over Internet Protocol).

The illustrative example below will describe the principles of the present disclosure with a positional information device, e.g., a GPS device, used in conjunction with a vehicle.

Initially, in step 402, a user activates the device 100 for telematics service in the vehicle. The activation may be initialized by a single designated button, e.g., any one of the plurality of buttons 108, a designation portion on the touch screen, by voice recognition, etc. The user is now connected to a predetermined customer service center (CSC) via analog or digital communications or any other type of communication link that the telematics service may currently use as described above. The telematics service identifies the vehicle or device to the service center including the communications channel to the vehicle, for example, the cellular phone number to transmit information into the vehicle, or the Internet address (e.g., IP address) of the vehicle. This identification information can be transmitted to the customer service center from the device or the customer service center can detect the user identity by conventional techniques such as caller ID and then use this information to query a database to determine the user.

Once connected to the customer service center, the user can communicate with the customer service center with voice communications or with a vehicle user interface (VUI) including but not limited to keyboard, voice recognition, or mouse or pointer. In one embodiment, the customer service center includes a live operator 303 that has access to server 304 for looking up address information and transmitting the information to the device. In this embodiment, the user will interact with the live operator via voice communications. In another embodiment, the server 304 will interact electronically with the device. In this embodiment, the user may use voice commands and the voice and/or speech recognition algorithm in the device will convert the user's speech into digital data which the device will transmit to the server 304. Alternatively, the user may interact with the server 304 via the vehicle user interface including the display module 104 and input module 106.

In step 404, the telematics service then transmits a user request via digital or analog communications to the remote customer service center (CSC). The user will use the VUI or voice to tell the customer service center the address of the location that they need route guidance to. In the case of a live operator 303, the live operator 303 will input this information into the server 304, or alternatively, if the customer has used a VUI that transmits this information directly to the customer service center, then this information is already in the server 304.

The customer service center server 304 then resolves the address, or alternatively, transmits the address to another server on the global computer network (e.g., the Internet) and using standard computer processing power and computer address programs including but not limited to teraserver.microsoft.com, geocoder.us, yahoo.com, and maporama.com resolves the address into exact longitude and latitude coordinates (step 406).

Once the requested location information has been resolved, the server 304 will transmit this longitude and latitude information to the designated customer GPS device's internal or external memory, e.g., storage module 110 (step 408). This transmission will be by any standard communications protocol now known or existing in the future as described above. The designated GPS device receives this longitude and latitude information and stores the information in internal or external memory via the communication module 112 and processing module 120. When the user requests route guidance from the device 100, and using standard GPS computer processing power and systems, the device 100 provides route guidance to the customer via the display module 104 (step 410). In this manner, a user will be able to enter and/or program a positional information device with little or no effort.

In another embodiment of the present disclosure, a user may program the device 100 by using their local computer 306, which is coupled to the communications network 302, e.g., the Internet. The user may connect to server 304 via a client application program, e.g., a conventional web browser such as Microsoft™ Internet Explorer, and enter a location into the client application which the user would like to receive route guidance for subsequently at their respective device 100. Alternatively, the user may be browsing web sites residing on servers on the Internet and finds a location of interest that they are interested in receiving route guidance to. The user indicates to the remote server 304 via the client application that he wants the specified address information of the location of interest provided to the device 100. In one embodiment, a tool bar may be implemented with the client application, so while a user is browsing web sites, the user will enter the location of interest into the tool bar to be transmitted to the server 304 for coordinate determination. In another embodiment, a software plug-in may be provided to run with the client application, e.g., the web browser, wherein while the user is browsing web sites, a user will highlight, e.g., with a pointing device, an address displayed and by simply clicking on a portion of the displayed screen will transmit the location of interest to the server 304.

When utilizing the client application program, the user may be identified at the server by an identifier, e.g., an Internet cookie, previously placed on the user's local computer 310. When transmitting the location of interest, the local computer 306 may also transmit the cookie information so the user may be identified at the server without having to provide this information by manual input or spoken word. The remote server then utilizes a standard database lookup program, based on the received identifier, to find out information on the user's device including the transmission information for the device which may be the cellular telephone number of the device or a vehicle or the Internet address (e.g., the IP address) of the device or vehicle.

The server 304 then resolves the address into longitude or latitude coordinates using standard computer processing power and computer programs on the global computer network including but not limited to teraserver.microsoft.com, geocoder.us, yahoo.com, and maporama.com. The server 304 then transmits the longitude and latitude information to the designated customer GPS device's internal or external memory. This transmission will be by any standard communications protocol now known or existing in the future as described above. The designated GPS device receives this longitude and latitude information, via communication module 112, and stores it in internal or external memory. The customer then requests route guidance from the GPS device, and using standard GPS computer processing power and systems, the positional information device provides route guidance to the user.

It is to be appreciated that the user may transmit multiple addresses to the server 304, and the server will use computer processing power and software programs to resolve the multiple addresses into multiple latitude and longitude coordinates. The user may also transmit the time and date that each address will be utilized. This information will also be transmitted to the subject GPS device. The GPS device will then display the address at the specified date and time and route guidance for that address will be given. When the date and time changes, the GPS device will then display the next specified and stored address on the date and time that corresponds to that address.

Figure 5:
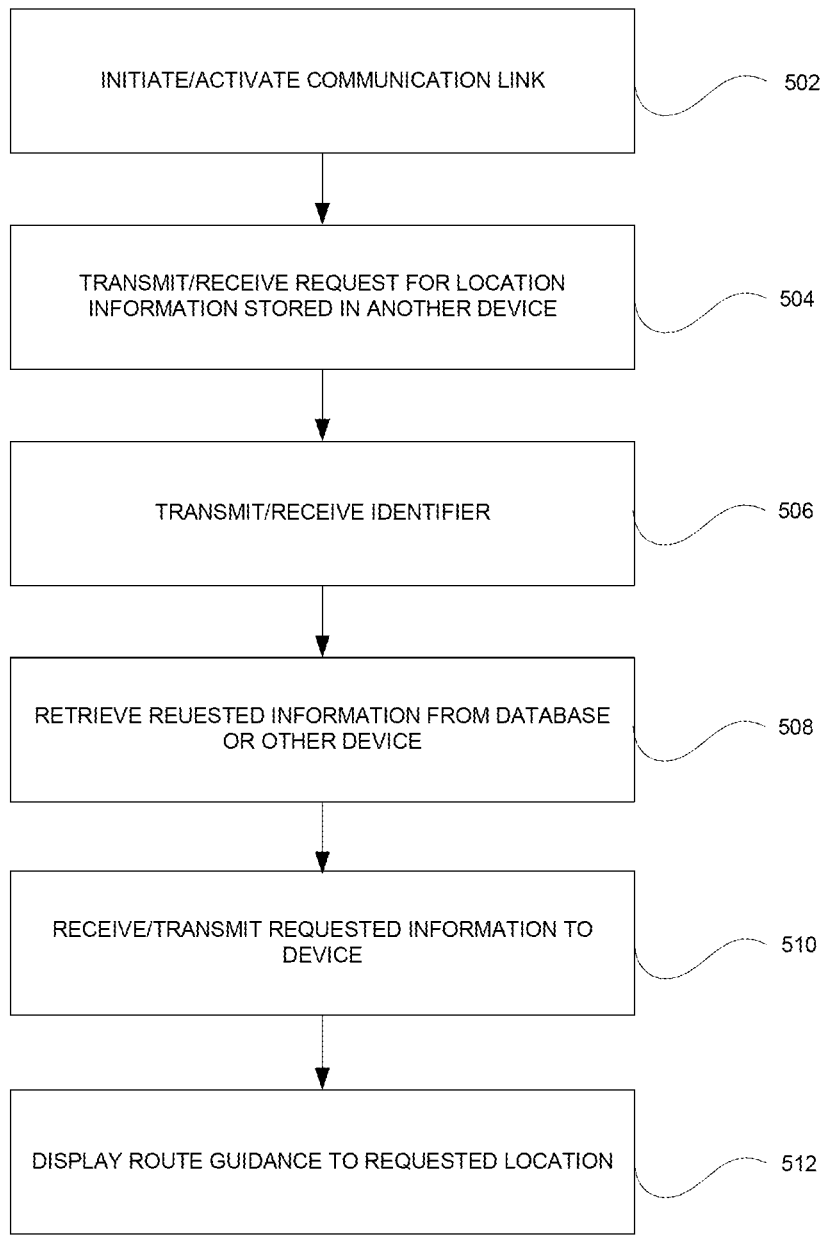
FIG. 5 is a flow diagram illustrating a method for entering, storing and sharing location information in GPS devices according to another embodiment of the present disclosure.

In another embodiment of the present disclosure, a method is provided for accessing address stored at a remote location, another GPS device, etc. Referring to FIG. 5, a user activates the device for telematics service in the vehicle (step 502). Alternatively, the user may make the request for service from a site on the global computer network (e.g., the Internet). In the case of telematics, the service then transmits a user request via digital or analog communications to the remote customer service center server 304 (step 504). Telematics identifies the device or vehicle to the customer service center including the communications channel to the vehicle, for instance the cellular phone number to transmit information into the device or vehicle, or the Internet address (e.g., IP address) of the vehicle. In the case of an Internet request, the user will use their local computer 310 coupled to communications network 302 to transmit the request to the server 304 located at the customer service center. The user's device or vehicle is now connected to customer service center via analog or digital communications and can communicate with the customer service center with voice communications or with a vehicle user interface (VUI) including but not limited to keyboard, or mouse or pointer.

The user will now use the VUI or voice to tell the customer service center that they need address information from another device or vehicle that has been registered with the customer service center or that will be registered with the customer service center. If the other device has been registered, the user will provide a password, using voice communications or the VUI, to allow the customer service center to unlock information stored in a standard database lookup program, such information relating to the communications channel (e.g., IP address or cellular phone number) of the registered device (step 506). If the other device has not been registered, then customer will provide with voice communications or by using the VUI the communications channel to the device, e.g., the cellular phone number or the Internet address (e.g., IP address) of the device. The user would then also provide a password so either the server or live operator can be granted access to the other device.

The server 304 or operator 303 of the customer service center will then use the communications channel of the designated device or vehicle to contact the device and retrieve the stored address information from the internal or external memory of the GPS device (step 508). The designated device will then use standard communications protocols now known or existing in the future to transmit the stored address information on the external or internal memory back to the server 304 or operator 303 of the customer service center. The server 304 or operator 303 of the customer service center will then transmit this address information to the user's current device or vehicle from where the user originated the request (step 510). The user may then request route guidance from the designated GPS device, and using standard GPS computer processing power and systems, the device provides route guidance to the user (step 512).

The server 304 may also store and retain the address information in its database 306 to provide this information on request to the user at any future point in time. For example, in the above described method, the server 304 may perform the retrieving step (step 508) by simply retrieving a previously stored address from the database 306. In a further embodiment, the server 304 may periodically poll each device registered to a user to retrieve any entered address and store such addresses in the database. In this embodiment, any address entered in any device belonging to the registered user will be accessible to the user at any other registered device of the user.

The present disclosure will enable at least the following applications of the devices, systems and methods disclosed herein.

A driver is driving along in a vehicle and wishes not to stop but needs direction to a destination. The driver pushes a button on an embodiment of the device described above and is connected to a service operator. Alternatively, the user may activate the device by voice command. The user indicates the address of the location that he is interested in but is not sure of the city for the address. The service operator quickly locates the city of the address by using conventional address lookup database software. The service operator then inputs this address into the computer server that he/she is using. The operator then has the server contact the GPS device in the owner's vehicle and transmits the latitude and longitude coordinates of the address to the vehicle's GPS device. The driver is then able to utilize his/her GPS unit to get route guidance to the specified address. All of the above has occurred without the driver ever having to take his/her hand off the steering wheel of the vehicle.

A driver of a vehicle needs assistance in locating a point of interest such as a museum in a designated city. The driver presses the telematics button in the vehicle (or issues a voice command) and is connected to a service operator. The operator identifies the vehicle and then the operator asks the driver for information on what museum they are looking for. Once the service operator locates the museum for the driver, the operator then submits the address of this museum to the server and the computer server resolves the address into latitude and longitude coordinates for the specified address. The service operator then transmits this information from the server to the memory of the driver's GPS device. The driver is then able to obtain route guidance to his/her specified location.

A driver of a vehicle needs route guidance to a specific location. When the driver enters the address information into the vehicle's GPS device, the device indicates to the driver that this address does not exist. The driver tries different permeations of the address including different cities, different street numbers, and different spellings of the street. Unfortunately, nothing works for the driver. The driver presses the telematics button in the vehicle (or issues a voice command) and is connected to a service operator. The operator identifies the vehicle and then the operator asks the driver for the information on what address he is looking for. The service operator then places this information into the computer server. Using various associated information on the address including but not limited to the name of a person residing at the address, the cross street that the address is at, the zip code of the address, the phone number of the address, alternative spellings of the address, and other information on the address, the operator is able to use this information, and various computer lookup databases 307 including phone number reverse search databases, zip code lookup databases, aerial location programs such as Google Earth, address databases, business yellow page databases, mapping software databases and other databases to resolve what is the correct address of the desired location. Once the service operator locates the correct address, the operator then submits the address to the server and the server resolves the address into latitude and longitude coordinates for the specified address. The service operator then transmits this information from the server to the memory of the driver's GPS device. The driver is then able to obtain route guidance to the specified location.

A driver wishes to be provided route information for a trip that they are taking. The driver goes online via a local computer to the Internet or presses the telematics button in the vehicle (or issues a voice command). In either case, the driver selects the itinerary for the trip including restaurants, hotels, other points of interest, and then the driver reviews and approves the trip itinerary. Once the itinerary has been approved, the user's computer transmits the latitude and longitude coordinates of each planned stop to the memory of the user's GPS device along with the suggested time and/or date for each stop. Alternatively, the telematics service resolves and transmits the latitude and longitude of each planned stop to the memory of the user's GPS device. The user is now able to start on the trip, and to receive complete route guidance information as it is needed and when it is needed.

A driver books a hotel reservation or a concert event online. Once the reservation has been made, the driver asks the online service to provide him with directions to the location. The driver indicates the communications link to the GPS device (either a direct link or through a telematics service). The reservation service computer then transmits the latitude and longitude coordinates and date of the location to the requested vehicle's GPS device. The GPS device then stores this information in memory. At the date and time that the user has stored, the GPS device will then provide the user with route guidance to the designated location.

A driver of a vehicle needs route guidance information to an address that is stored in his/her other vehicle. The driver has no access to this vehicle because it is not geographically close. The driver presses the telematics button in this vehicle (or issues a voice command) and is connected to a service operator. The operator identifies the vehicle and with a password provided by the user establishes that the caller has security clearance to the requested information. The operator then looks up the list of subject addresses that the driver has stored for their vehicles, or in the event that the driver has stored the needed address in another vehicle's GPS memory, the operator communicates with the other vehicle's GPS system and reads the list of addresses that are stored in memory. In either event, the service operator then transmits the needed address or addresses from the server they are operating into the memory of the GPS device in the subject vehicle. The driver is then able to obtain route guidance to the specified location.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for receiving location information at a positional information device, the method comprising:
   sending a request from a requesting positional information device to a server for at least one address stored in at least one sending positional information device, the request including a first identifier of the requesting positional information device;
   receiving at the requesting positional information device, from the server, a retrieved at least one address to the requesting positional information device wherein the server determines a second identifier for identifying the at least one sending positional information device based on the received first identifier and retrieves the requested at least one address stored in the identified at least one sending positional information device.

2. The method as in claim 1, wherein the first identifier is at least one of a mobile phone number and an IP address.

3. The method as in claim 1, wherein the at least one address is transmitted in at least one of longitude and latitude coordinates and an address.

4. The method as in claim 1, wherein the at least one address is graphically displayed on a map.

5. The method as in claim 1, wherein the request is received by voice communication.

6. The method as in claim 1, wherein the second identifier of the sending positional information device is at least one of a mobile phone number and an IP address.

7. The method as in claim 1, wherein the retrieving the at least one address includes retrieving the at least one address from a database residing on a server, the database being associated to the at least one sending positional information device.

8. A requesting positional information device for receiving location information over a communication network, the requesting positional information device comprising:
   a locational information module for determining location information of the requesting positional information device;
   a communication module for receiving the address of the at least one location from the server;
   a processing module configured to receive the address from the communication module and determine route guidance based on the location of the requesting positional information device and the received address; and
   a display module for displaying the route guidance; and
   wherein the requesting positional information device sends a request to a server for the at least one address stored in the at least one sending positional information device, the request including a first identifier of the requesting positional device, wherein the requesting positional device receives the retrieved at least one address from the server such that the server determined a second identifier for identifying at least one sending positional information device based on the received first identifier, and the server retrieved the requested at least one address stored in the at least one sending positional information device.

9. The requesting positional information device as in claim 8, wherein the first identifier is at least one of a mobile phone number and an IP address.

10. The requesting positional information device as in claim 8, wherein the at least one address is transmitted in at least one of longitude and latitude coordinates and an address.

11. The requesting positional information device as in claim 8, wherein the address is graphically displayed on a map.

12. The requesting positional information device as in claim 8, wherein the communications network is a telematics network.

13. The requesting positional information device as in claim 8, wherein the second identifier of the at least one sending positional information device is at least one of a mobile phone number and an IP address.

14. The requesting positional information device as in claim 8, wherein the server retrieves the coordinates from a database residing on the server, the database being associated to the at least one sending positional information device.

15. The requesting positional information device as in claim 8, wherein the server is operated by a live operator and the request for the at least one location is received by voice communications.

\* \* \* \* \*